United States Patent [19]
Hershbarger

[11] Patent Number: 5,533,053
[45] Date of Patent: Jul. 2, 1996

[54] LOW FREQUENCY COMMON MODE REJECTION IN A CLOCK CIRCUIT

[75] Inventor: Russell A. Hershbarger, Nevada City, Calif.

[73] Assignee: Silicon Systems, Inc., Tustin, Calif.

[21] Appl. No.: 243,563

[22] Filed: May 16, 1994

[51] Int. Cl.$^6$ ........................................ H04B 3/06
[52] U.S. Cl. ..................... 375/257; 375/318; 333/33; 340/310.05
[58] Field of Search ...................... 375/219, 257, 375/316–318, 377; 333/12, 32–33, 24 C; 340/310.05, 310.06

[56] References Cited

U.S. PATENT DOCUMENTS

| | | | |
|---|---|---|---|
| 4,493,092 | 1/1985 | Adams | 375/219 |
| 4,556,864 | 12/1985 | Roy | 375/219 |
| 4,697,166 | 9/1987 | Warnagiris et al. | 375/257 |
| 5,253,249 | 10/1993 | Fitzgerald et al. | 375/219 |
| 5,325,395 | 6/1994 | Tran | 375/219 |

OTHER PUBLICATIONS

IBM Technical Disclosure Bulletin vol. 32 No. 2 Jul. 1989.

*Primary Examiner*—Young T. Tse
*Attorney, Agent, or Firm*—Hecker & Harriman

[57] ABSTRACT

A method and apparatus for passing a high frequency signal across an isolation barrier while rejecting low frequency common mode interference is provided. A high frequency signal is coupled across an isolation barrier. A circuit comprising an element having an impedance that is a function of frequency rejects low frequency common mode interference. The high frequency signal is provided as an output. The present invention is useful, for example, for isolating telephone apparatus, such as a telephone modem, from a telephone line.

6 Claims, 8 Drawing Sheets

LOW FREQUENCY COMMON MODE REJECTION IN A CLOCK CIRCUIT

BACKGROUND OF THE INVENTION

1. Field of the Invention

The present invention relates generally to a method and apparatus for reducing interference to electrical signals and, particularly, to a method and apparatus for increasing immunity of a signal to low frequency noise.

2. Background Art

Digital circuits typically utilize squarewave signals or transitions having binary levels. The binary levels or the transitions are used to represent data. Since the data represented by a signal changes over time, the timing of the signal is referenced to a timing standard, or clock. A clock typically provides a clock signal in the form of a regular squarewave of a fixed frequency and phase. Since the operation of a synchronous digital circuit may be synchronized by a clock signal, a synchronous digital circuit may malfunction if noise or other interference is present on the clock signal. Thus, it is necessary to keep a clock signal clear of such noise or interference.

Noise and interference is more likely to occur on a clock signal in clock distribution circuits having high output impedance or where the output impedance is mismatched from the line impedance. For example, if a long wire is used to distribute a clock signal, the long wire will act as a transmission line having a characteristic impedance. The clock signal will propagate down the transmission line until it reaches the end. If the end is unterminated, the clock signal will be reflected at the end and will propagate backward along the transmission line. Such a reflection can also occur at the original end of the transmission line. If reflections occur at both ends of the transmission line, a long series of reflections can continue to occur at alternating ends of the transmission line, causing substantial degradation of the clock signal. This degradation often appears as overshoot/undershoot and ringing. Overshoot occurs when a signal exceeds the positive limit of the acceptable voltage range for representing logical values. Similarly, undershoot occurs when a signal falls below the negative limit of the acceptable voltage range for representing logical values. Ringing is a decaying oscillation that is superimposed on a voltage representing a logical level following a transition.

Figure 1A:
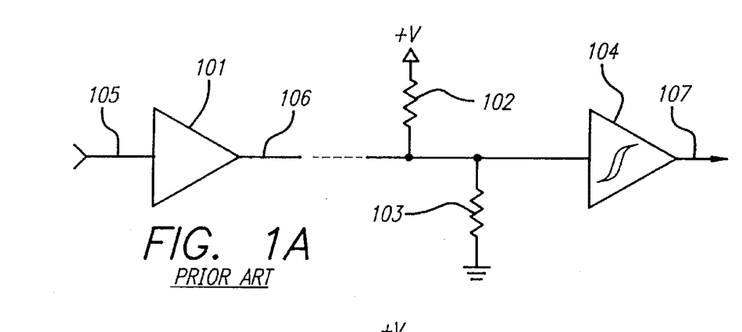
FIG. 1A is a schematic diagram illustrating one technique for eliminating impedance mismatch and associated problems.
Figure 1B:
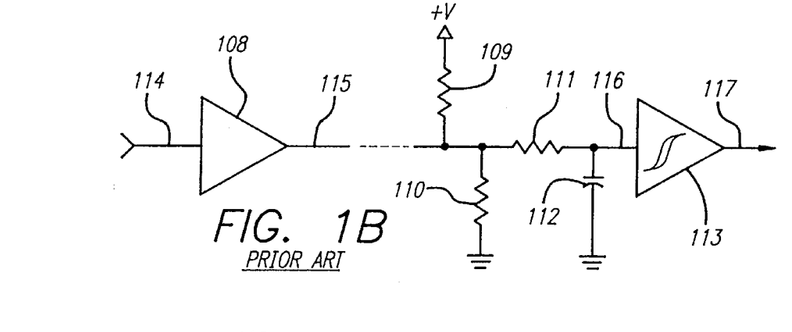
FIG. 1B is a schematic diagram illustrating another technique for eliminating impedance mismatch and associated problems.
Figure 1C:
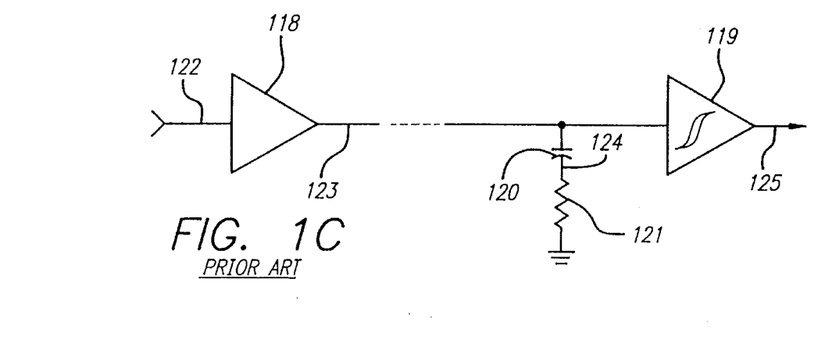
FIG. 1C is a schematic diagram illustrating yet another technique for eliminating impedance mismatch and associated problems.

FIGS. 1A, 1B, and 1C illustrate well-known techniques for eliminating overshoot/undershoot, ringing, and other degradation resulting from impedance mismatches. FIG. 1A illustrates one technique for eliminating impedance mismatch and associated problems. Buffer 101, which has an open collector or totem pole output, receives an input at node 105 and provides an output at node 106. Node 106 may be a long wire or PC board trace that acts as a transmission line. At the distant end of the signal line represented by node 106, a resistor 102 is coupled from the signal line to the positive supply voltage. A resistor 103 is coupled from the signal line to ground. The distant end of the signal line is also coupled to an input of Schmitt trigger buffer 104. The output of Schmitt trigger buffer 104 is coupled to node 107.

Since the input of Schmitt trigger buffer 104 has a relatively high input impedance, the signal propagating down the signal line at node 106 sees a termination impedance equal to the parallel combination of the resistor 102 and resistor 103. To provide proper impedance matching, values are chosen for resistors 102 and 103 such that the parallel combination of resistors 102 and 103 are equal to the characteristic impedance of the transmission line at node 106, while the ratio of resistors 102 and 103 allow buffer 101 to swing node 106 well into validity voltage ranges for logic levels zero and one.

FIG. 1B illustrates another technique for eliminating impedance mismatch and associated problems. Buffer 108, which has an open collector or totem pole output receives an input at node 114 and provides an output at node 115. Node 115 may be a long wire or PC board trace that acts as a transmission line. At the distant end of the signal line represented by node 115, a resistor 109 is coupled from the signal line to the positive supply voltage. A resistor 110 is coupled from the signal line to ground. The distant end of the signal line is also coupled to the first terminal of resistor 111. The second terminal of resistor 111 is coupled to the first terminal of capacitor 112 and to an input of Schmitt trigger buffer 113 at node 116. The output of Schmitt trigger buffer 113 is coupled to node 117.

As in FIG. 1B, a signal propagating down the transmission line at node 115 sees the parallel combination of resistors 109 and 110. Then, the signal is low-pass-filtered by the combination of resistor 111 and capacitor 112 to reduce the effects of high frequency noise. The filtered signal is then applied to Schmitt trigger buffer 113, which restores the desired square edges (fast transitions) to the signal.

FIG. 1C illustrates yet another technique for eliminating impedance mismatch and associated problems. Line driver 118, which has a high current output (such as that of a 74AC244 line driver), receives an input at node 122 and provides an output at node 123. Node 123 may be a long wire or PC board trace that acts as a transmission line. At the distant end of the signal line represented by node 123, the signal line at node 123 is coupled to the first terminal of capacitor 120. The second terminal of capacitor 120 is coupled to node 124 and to the first terminal of resistor 121. The second terminal of resistor 121 is coupled to ground. The distant end of the signal line is also coupled to an input of Schmitt trigger buffer 119. The output of Schmitt trigger buffer 119 is coupled to node 125.

The series combination of capacitor 120 and resistor 121 provides an AC termination to the distant end of the signal line at node 123. Line driver 118 provides a low impedance output to increase noise immunity. Schmitt trigger buffer 119 helps clean up distortion of the signal from line driver 118 that might occur as the signal propagates down the transmission line at node 123.

Although the circuits of FIGS. 1A–1C help reduce the effects of noise and interference on a signal being transmitted, they do not provide a high voltage barrier to isolate parts of a system that operate at voltages that may differ greatly. Furthermore, the circuits of FIGS. 1A–1C do not provides immunity to low frequency interference for high frequency signals. In fact, the circuit of FIG. 1B includes a low pass filter to reduce high frequency noise, but provides no protection against low frequency noise specifically. Thus, a method and apparatus is needed to reduce low frequency interference while transmitting a high frequency signal across a high voltage isolation barrier.

SUMMARY OF THE INVENTION

The present invention provides a method and apparatus for reducing low frequency interference while transmitting a high frequency signal across a barrier. The present invention rejects signals below the frequency of the desired signals while passing the desired signals. The present invention also allows the desired signals to be transmitted across an isolation barrier to allow the signals to be communicated between parts of a system operating at voltages that may differ greatly.

In the present invention, high common mode rejection is provided at low frequency for a circuit operating at high frequency. A transconductance amplifier with a feedback capacitor provides varying impedance over frequency. The variation in impedance over frequency is used to selectively filter out interference at frequencies less than that of the desired signals. One example of an application in which the present invention may be usefully employed is the use of a capacitive barrier to isolate a telephone line front end circuit from other circuits, such as the circuits of a modem. Since modem circuits typically operate at carefully controlled low voltages, they are typically isolated from a telephone line, upon which signals varying over hundreds of volts may be present. Common mode signals, especially those at 60 Hz, are often present on telephone lines at substantial amplitudes. The present invention may be used to increase the immunity of modem circuits to such common mode signals.

In the preferred embodiment of the present invention, a buffer or inverter provides a signal to an isolation capacitor. The isolation capacitor maintains an isolation barrier while coupling the signal across the isolation barrier, The isolation capacitor is coupled to a circuit comprising an impedance element, a comparator, a reference voltage, and an inverter or buffer. The impedance element has an impedance that changes over frequency, being relatively high at high frequency and relatively low at low frequency. The impedance element is provided by a transconductance amplifier having a feedback capacitor.

The first buffer or inverter provides a clean signal for application to the isolation capacitor. The signal is coupled across the isolation capacitor to the circuit containing the impedance element. The circuit containing the impedance element inserts loss at low frequencies while minimizing loss at high frequencies. Since undesired common mode signals are typically at low frequencies, the present invention reduces undesired common mode signals while passing desired signals across a barrier. Thus, the present invention overcomes the disadvantages of the prior art.

DETAILED DESCRIPTION OF THE INVENTION

A method and apparatus for reducing low frequency interference while transmitting a high frequency signal across a barrier is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, circuits for reducing interference and noise have been known. However, these circuits typically have not allowed communication of a signal between two circuits operating at greatly differing voltages. Also, methods of coupling circuits operating at greatly differing voltages have been vulnerable to noise and interference. Thus, there has been a need for a method and apparatus for coupling a signal across a barrier while reducing noise and interference.

The present invention couples signals across a barrier while providing high common mode rejection at low frequencies. Since much common mode interference is typically present at low frequencies, such as 60 Hz, the present invention is effective at reducing noise and interference at low frequencies.

Figure 2:
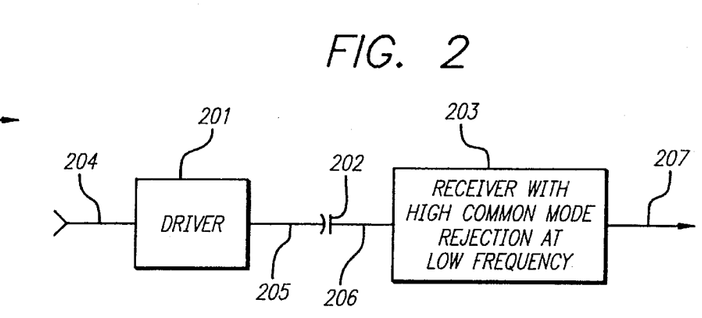
FIG. 2 is a block diagram illustrating apparatus according to the present invention.

FIG. 2 illustrates apparatus according to the present invention. Node 204 is coupled to an input of driver 201. Driver 201 provides an output through node 205 to a first terminal of capacitor 202. A second terminal of capacitor 202 is coupled through node 206 to an input of receiver 203. Receiver 203 provides high common mode rejection at low frequency. An output of receiver 203 is coupled to node 207.

Driver 201 provides a signal at high frequency to capacitor 202. Capacitor 202 provides an isolation barrier while coupling the signal from driver 201 to receiver 203. Receiver 203 provides high common mode rejection at low frequency to provide high immunity to low frequency noise or interference present at node 206. Thus, receiver 203 provides the desired signal at node 207 while removing low frequency noise or interference.

Figure 3:
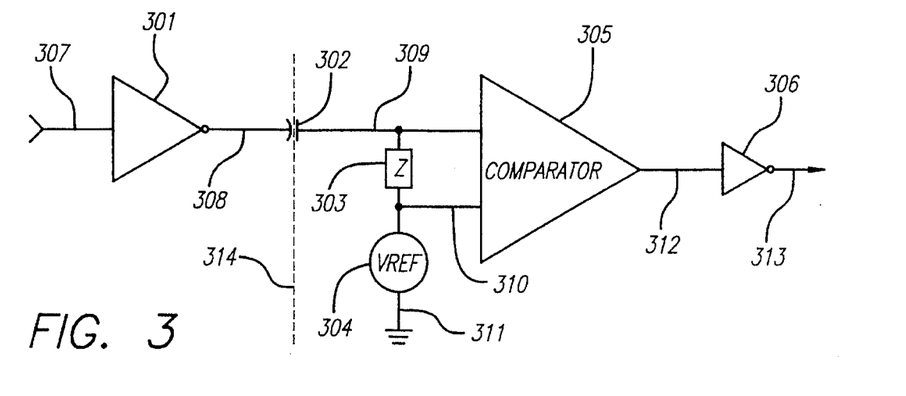
FIG. 3 is a schematic diagram illustrating the preferred embodiment of the present invention.

FIG. 3 illustrates the preferred embodiment of the present invention. Node 307 is coupled to an input of inverter 301. Inverter 301 may alternatively be a non-inverting buffer. The output of inverter 301 is coupled through node 308 to a first terminal of capacitor 302. A second terminal of capacitor 302 is coupled through node 309 to a first terminal of impedance element 303 and to a first input terminal of comparator 305. The second terminal of impedance element 303 is coupled to a first terminal of reference voltage source VREF and to a second terminal of comparator 305. A second terminal of reference voltage source VREF is coupled to ground. The output of comparator 305 is coupled through node 312 to an input of inverter 306. Inverter 306 may alternatively be a non-inverting buffer. The output of inverter 306 is coupled to node 313.

A signal is received from node 307 by inverter 301. Inverter 301 provides an output to capacitor 302, which couples the signal across isolation barrier 314 to node 309.

Since capacitor 302 has a small value, for example 50 pF, it acts as a high pass filter that provides ~60 dB of loss at 60 Hz. However, additional loss at low frequency is provided by the circuit comprising impedance element 303. Impedance element 303 provides impedance that is a function of frequency. In the preferred embodiment of the present invention, Z≈100 kΩ at 1 MHz and Z≈10 KΩ at 60 Hz. Since the present invention may be used to transmit signals at frequencies on the order of one megahertz, and rejection of frequencies on the order of 60 Hz is typically desired, the difference in impedance of impedance element 303 between these frequencies allows desired signals to be passed while undesired frequencies are filtered out. The lower impedance of impedance element 303 at lower frequencies causes low frequency signals to be attenuated at the inputs of comparator 305 relative to high frequency signals. Comparator 305 outputs a signal via node 312 to inverter 306, which inverts the signal and provides an output at node 313.

Figure 4:
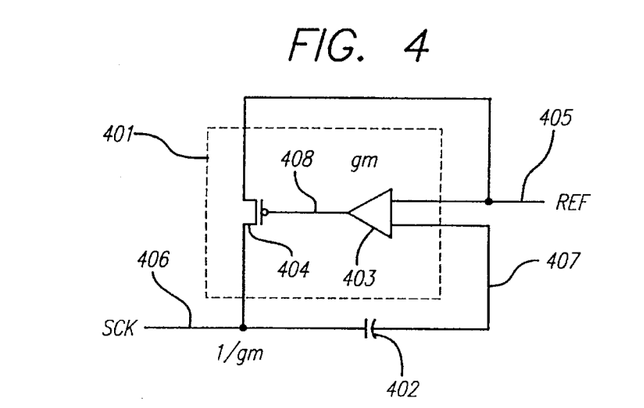
FIG. 4 is a schematic diagram illustrating the impedance element of the preferred embodiment of the present invention.

FIG. 4 illustrates the impedance element of the preferred embodiment of the present invention. Transconductance element 401 is provided with feedback capacitor 402. Node 405 is coupled to node 310 of FIG. 3. Node 406 is coupled to node 309 of FIG. 3. Node 405 is also coupled to a first input of amplifier 403 and to a first terminal of P-channel MOSFET 404. Node 406 is also coupled to a first terminal of capacitor 402 and to a second terminal of P-channel MOSFET 404. A second terminal of capacitor 402 is coupled through node 407 to a second input of amplifier 403. The output of amplifier 403 is coupled through node 408 to the gate terminal of P-channel MOSFET 404. Capacitor 402 provides a reactive feedback loop to transconductance element 401, causing the impedance of the impedance element to depend upon frequency.

Figure 5:
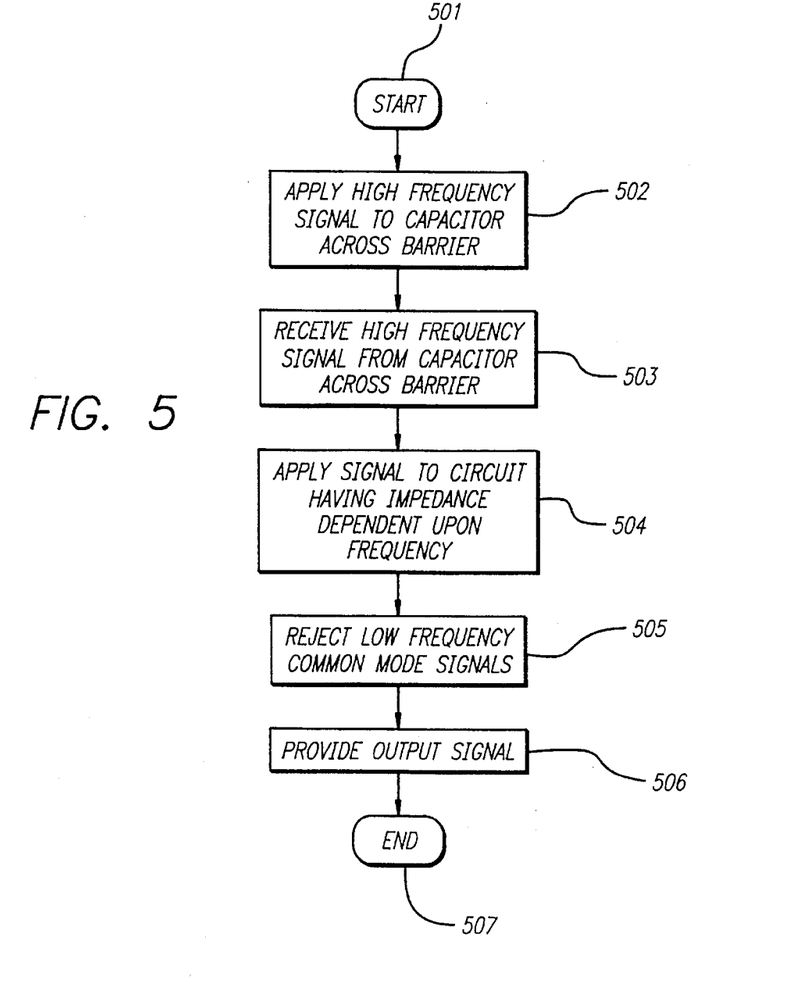
FIG. 5 is a flow chart illustrating a method according to the present invention.

FIG. 5 is a flow chart illustrating a method according to the present invention. The method begins in start block 501. In block 502, a signal is applied to a capacitor that lies across an isolation barrier. Although the signal is at a high frequency, low frequency interference may also be present along with the high frequency signal. In block 503, a signal is received from the capacitor that lies across the isolation barrier. Thus, the signal has been passed across the isolation barrier. In block 504, the signal is applied to a circuit having an impedance dependent upon frequency. The impedance dependency is such that low frequency rejection is provided, while a high frequency signal is allowed to pass. Consequently, in block 505, low frequency common mode signals interfering with the desired signal are rejected. In block 506, an output signal is provided. In block 507, the method ends.

The present invention may be used to couple signals across an isolation barrier between a telephone line and other equipment, for example, a telephone modem.

Figure 6A:
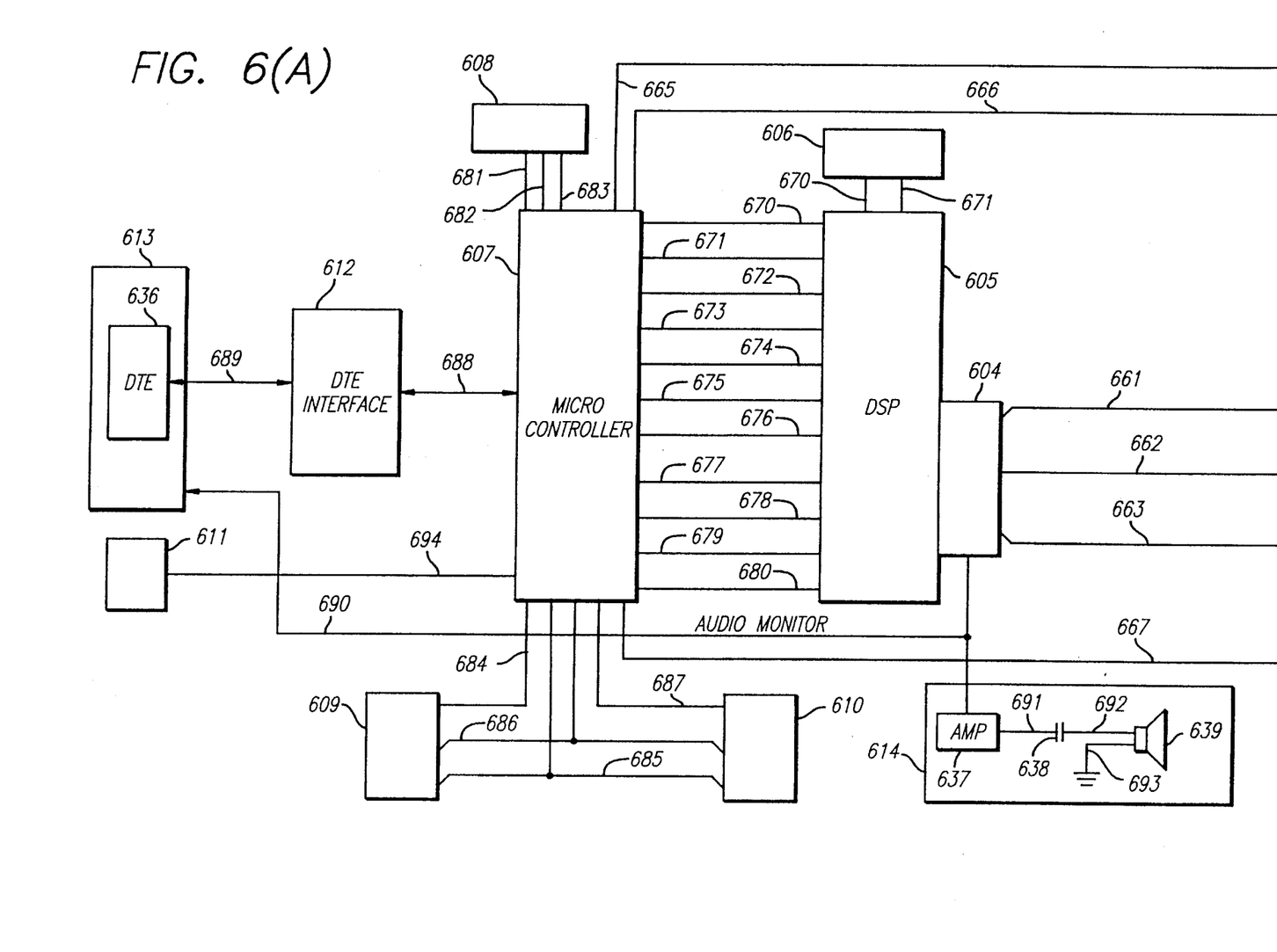
FIG. 6 is a diagram illustrating a system with which the present invention may be practiced.
Figure 6B:
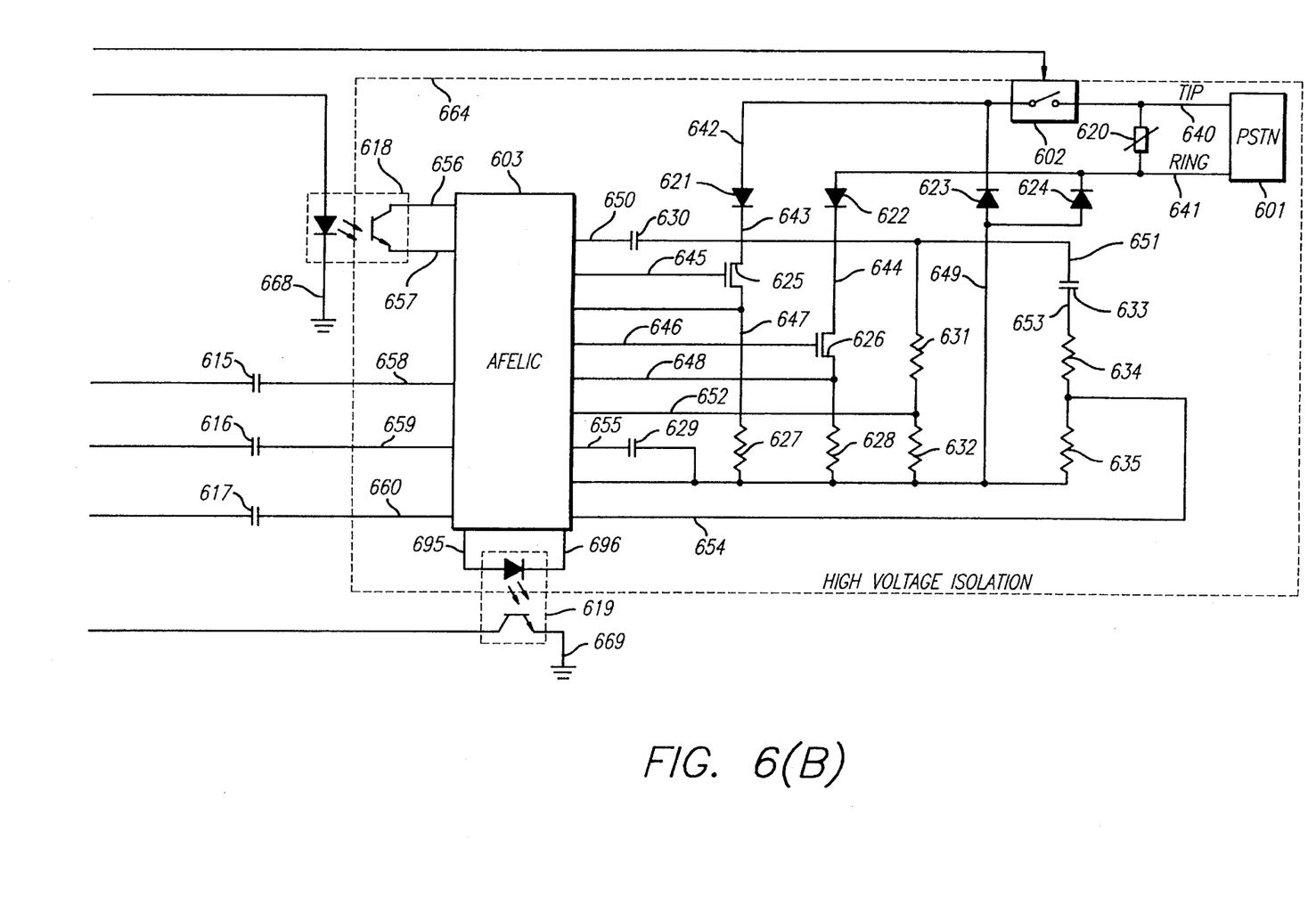

FIG. 6 is a diagram illustrating a system with which the present invention may be practiced. Tip connector 640 and ring conductor 641 are coupled to public switched network 601. Protector 620, which may be a varistor, such as a metal oxide varistor (MOV), or a sidactor, is coupled across tip conductor 640 and ring conductor 641. Tip conductor 640 is coupled to a first terminal of hook switch 602. A second terminal of hook switch 602 is coupled to node 642. Node 642 is coupled to the anode of diode 621 and to the cathode of diode 623. Ring conductor 641 is coupled to the anode of diode 622 and to the cathode of diode 624. The anode of diode 623 is coupled to the anode of diode 624 at node 649. The cathode of diode of 621 is coupled to node 643 and to the first terminal of field effect transistor (FET) 625. The gate of FET 625 is coupled to node 645 and to analog front and line interface circuit 603. The second terminal of FET 625 is coupled to node 647, to analog front end line interface circuit (AFELIC) 603, and to the first terminal of resistor 627. The cathode of diode 622 is coupled to node 644 and to the first terminal of FET 626. The gate of FET 626 is coupled to node 646 and to AFELIC 603. The second terminal of FET 626 is coupled to node 648, to AFELIC 603 and to the first terminal of resistor 628.

AFELIC 603 is coupled to node 650 and to the first terminal of capacitor 630. The second terminal of capacitor 630 is coupled to the first terminal of resistor 631 and to the first terminal of capacitor 633 at node 651. The second terminal of resistor 631 is coupled to AFELIC 603 and to the first terminal of resistor 632. The second terminal of capacitor 633 is coupled to node 653 and to the first terminal of resistor 634. The second terminal of resistor 634 is coupled to node 654 and to AFELIC 603. The second terminal of resistor 634 is also coupled to the first terminal of resistor 635. AFELIC 603 is coupled to node 655 and to the first terminal of capacitor 629. The second terminal of capacitor 629 is coupled to AFELIC 603. The second terminal of resistor 627, the second terminal of resistor 628, the second terminal of resistor 632 and the second terminal of resistor 635.

AFELIC 603 is coupled to node 695, which is coupled to the anode of the LED of optocoupler 619. The cathode of the LED of optocoupler 619 is coupled to node 696, which is coupled to AFELIC 603. AFELIC 603 is coupled to node 656, which is coupled to the collector of the photo transistor of optocoupler 618. The emitter of the photo transistor of optocoupler is coupled to node 657, which is coupled to AFELIC 603. AFELIC 603 is coupled to node 658, node 659, and node 660. Node 658 is coupled to the first terminal of capacitor 615. Node 659 is coupled to the first terminal of capacitor 656. Node 660 is coupled to the first terminal of capacitor 617. The above-described circuitry is illustrated as contained within high voltage isolation barrier 664. The high voltage isolation barrier provides the necessary isolation between the voltages that may be present on the public switched telephone network 601 and the host system 613.

The second terminal of capacitor 615 is coupled to node 661, which is coupled to analog front end interface (AFE interface) 604. The second terminal of capacitor 616 is coupled to node 662, which is coupled to AFE interface 604. The second terminal of capacitor 617 is coupled to node 663, which is coupled to AFE interface 604. AFE interface 604 provides an analog audio monitor signal at node 690. Node 690 is coupled to host block 613 and to amplifier 637 of audio output block 614. Amplifier 637 provides an output signal at node 691 which passes through capacitor 638 to appear at node 692. Node 692 is coupled to the first terminal of speaker 639. The second terminal of speaker 639 is coupled to node 693, which is coupled to ground. Audio output block 614 comprises amplifier 637, capacitor 638, and speaker 639. The audio monitor signal at node 690 is coupled to host block 613. AFE interface 604 is coupled to DSP block 605.

DSP block 605 is coupled through nodes 670 and 671 to block 606. DSP block 605 is also coupled to microcontroller 607 through nodes 670, 671, 672, 673, 674, 675, 676, 677, 678, 679, and 680. Microcontroller 607 is coupled through node 665 to the control terminal of hook switch 602. Microcontroller 607 is also coupled through node 666 to the anode of the LED of optocoupler 618. The cathode of the LED of optocoupler 618 is coupled to node 668, which is coupled to ground. Microcontroller 608 is coupled through node 667 to the collector of the phototransistor of optoisolator 619. The emitter of the phototransistor of optoisolator 619 is coupled to node 669, which is coupled to ground.

Microcontroller 607 is coupled through nodes 681, 682, and 683 to block 608. Microcontroller 607 is coupled through nodes 684, 684, 685, 686, and 687 to block 609 and block 610. Microcontroller 607 is coupled through bus 694 to block 611. Microcontroller 607 is coupled through bus 688 to DTE interface 612. DTE interface 612 is coupled through bus 689 to the DTE circuit 636 of host system 613.

In FIG. 6, the present invention may be used to reduce low frequency common mode interference on signals coupled across capacitors 615, 616, and 617. For example, the present invention may be used with AFELIC 603 to reduce low frequency common mode interference present on the clock signal at node 658.

Figures 7, 7A:
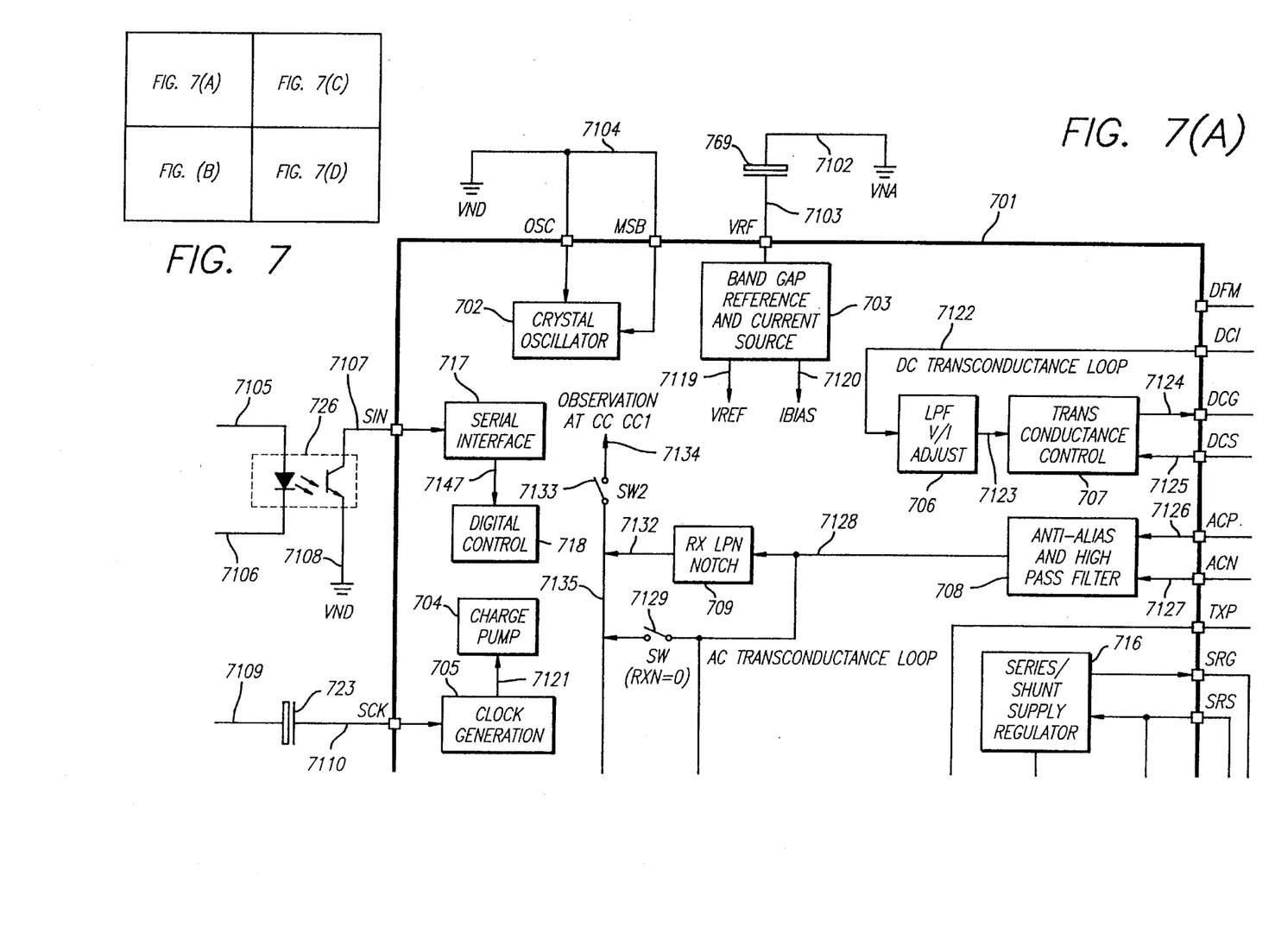
FIG. 7 is schematic diagram including FIGS. 7(A)–7(D) illustrating a circuit with which the present invention may be practiced.
Figure 7B:
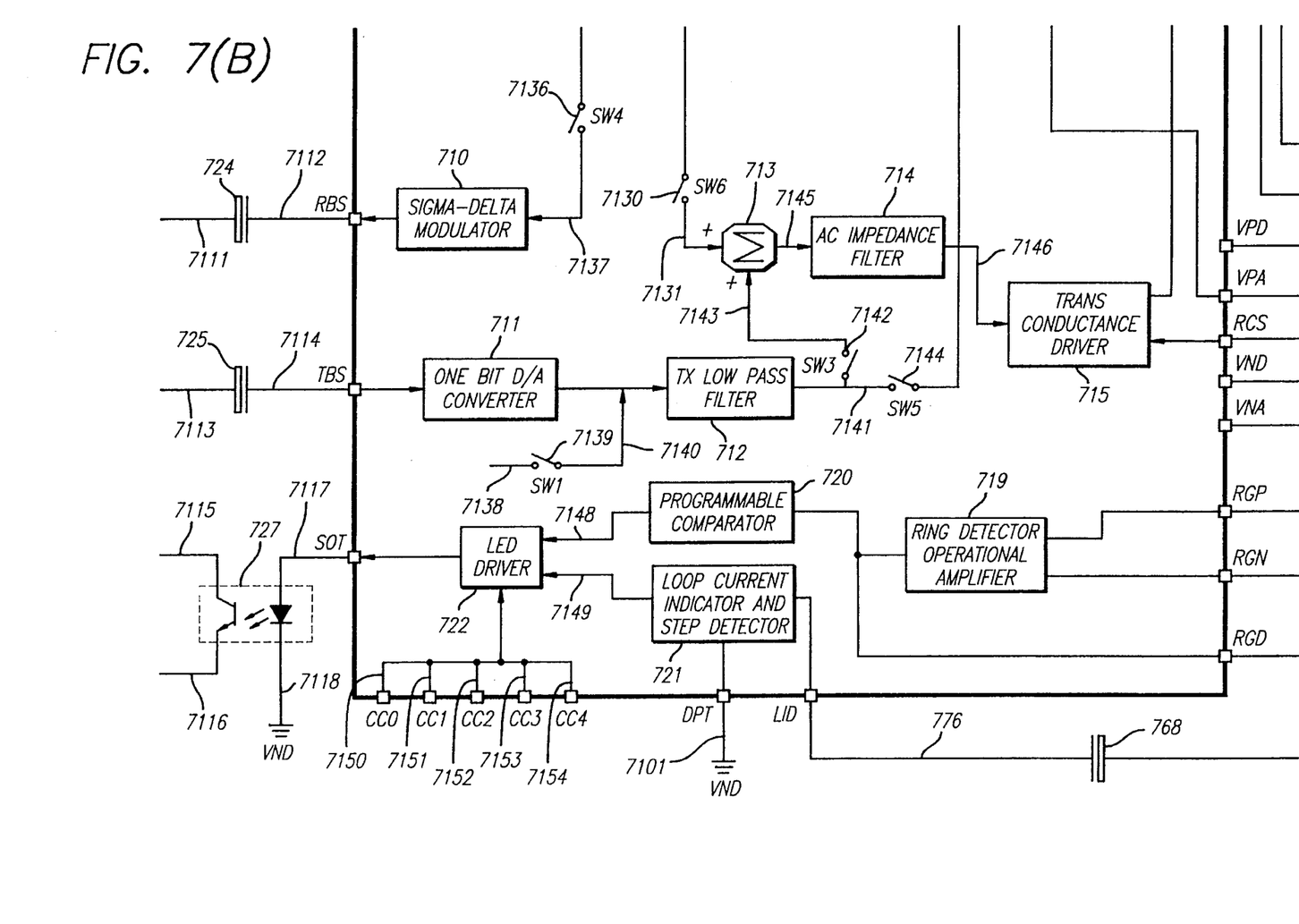
Figure 7C:
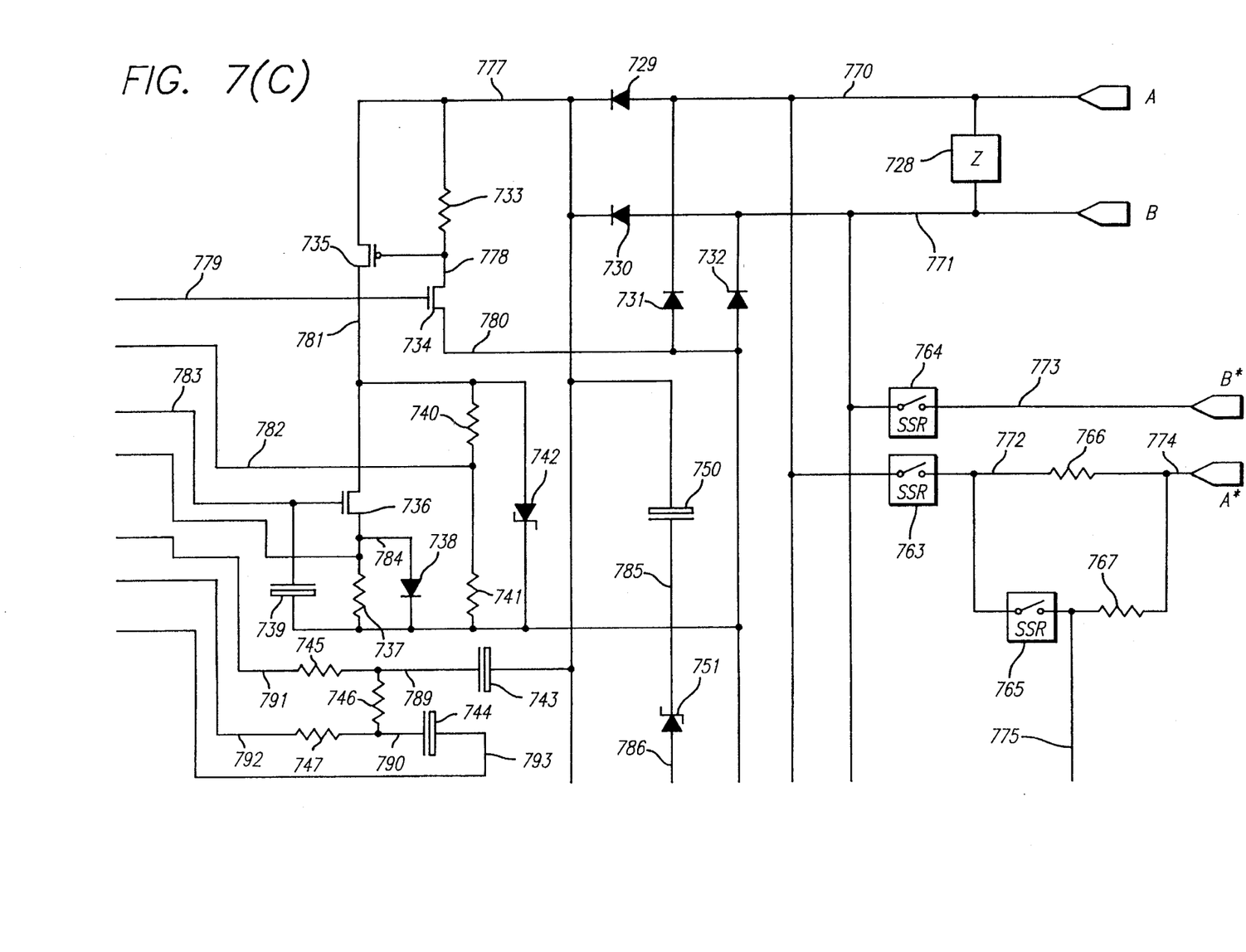
Figure 7D:
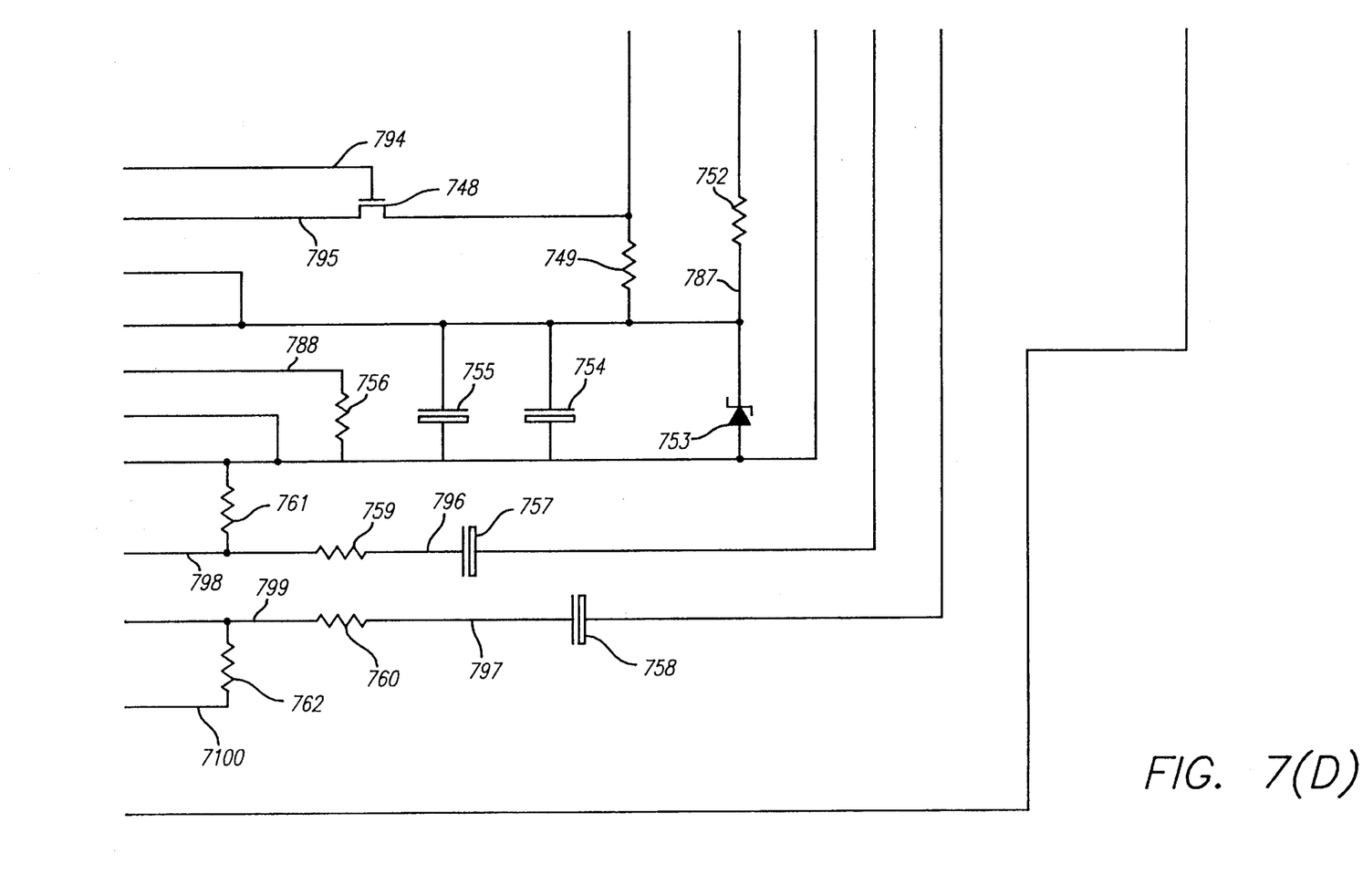

FIG. 7 is schematic diagram including FIGS. 7(A)–7(D) illustrating a circuit with which the present invention may be practiced. Analog front end line interface circuit 701 comprises crystal oscillator 702, bandgap reference and current source 703, charge pump 704, clock generation block 705, low pass filter V/I adjustment block 706, transconductance control block 707, anti alias and high pass filter block 708, receive low pass and notch filter block 709, sigma-delta modulator 710, one bit D/A converter 711, transmit low pass filter 712, summer 713, AC impedance filter 714, transconductance driver 715, series/shunt supply regulator 716, serial interface 717, digital control block 718, ring detector operational amplifier 719, programmable comparator 720, loop current indicator and step detector 721, and photodiode driver 722.

The two conductors of a telephone line are coupled to nodes 770 and 771. Protector 728, which may be a varistor, metal oxide varistor (MOV), or a sidactor, is coupled across telephone line conductors 770 and 771. Telephone line conductor 770 is coupled to the anode of diode 729, the cathode of diode 731, the first terminal of solid state relay 763, and the first terminal of capacitor 757. Telephone line conductor 771 is coupled to the anode of diode 730, to the cathode of diode 732, to the first terminal of solid state relay 764, and to the first terminal of capacitors 758. The second terminal of solid state relay 764 is coupled to node 773. The second terminal of solid state relay 763 is coupled to node 772. Node 772 is coupled to the first terminal of solid state relay 765, and to the first terminal of resistor 766. The second terminal of solid state relay 765 is coupled to the first terminal of resistor 767 and to the first terminal of capacitor 768. The second terminal of resistor 766 is coupled to node 774 and to the second terminal of resistor 767.

The second terminal capacitor 768 is coupled through node 776 to loop current indicator and step detector 721. Loop current indicator and step detector 721 is coupled through node 7101 to voltage VND, which is a digital ground. Loop current indicator and step detector 721 is coupled through node 7149 to photodiode driver 722. The second terminal of capacitor 757 is coupled through node 796 to the first terminal of resistor 759. The second terminal of capacitor 758 is coupled through node 797 to the first terminal of capacitor 760. The second terminal resistor 759 is coupled through node 798 to the first terminal of resistor 761 and to an input of ring detection operational amplifier 719. The second terminal of resistor 760 is coupled through node 799 to the first terminal of resistor 762 and to an input of ring detection operational amplifier 719. The second terminal of resistor 761 is coupled to node 780, which is coupled to voltages VNA and VND, which are analog and digital grounds, respectively.

The second terminal of resistor 762 is coupled through node 7100 to the output of ring detection operational amplifier 719 and to an input of programmable comparator 720. The output of programmable comparator 720 is coupled through node 7148 to LED driver 722. Inputs CC0, CC1, CC2, CC3, and CC4, which appear at nodes 7150, 7151, 7152, 7153, and 7154, respectively, are coupled to LED driver 722. The output of LED driver 722 is coupled through 7117 to the anode of the LED of optocoupler 727. The cathode of the LED of optocoupler 727 is coupler through node 7118 to voltage VND, which a digital ground. Node 1115 is coupled to the collector of the phototransistor optocoupler 727. The emitter of the phototransistor of optocoupler 727 is coupled to node 7116.

Node 7105 is coupled to the anode the LED of optocoupler 726. The cathode of the LED of optocoupler 726 is coupled to node 7106. The emitter of the phototransistor of optocoupler 726 is coupled through node 7108 to voltage VND, which is a digital ground. The collector of the phototransistor of optocoupler 726 is coupled through node 7107 to an input of serial interface 717. The output serial interface 717 is coupled through node 7147 to digital control block 718.

Voltage VND, which is a digital ground, is coupled through node 7104 to crystal oscillator 702. Bandgap current source 703 is coupled through node 7103 to the first terminal of capacitor 769. The second terminal of capacitor 769 is coupled through node 7102 to voltage VNA, which is an analog ground. Bandgap current source 703 provides voltage VREF at nodes 7119 and current IBIAS at node 7120.

The cathode of diode 729 is coupled through node 777 to the first terminal of PMOS FET 735, to the first terminal of resistor 733, to the cathode of diode 730, to the first terminal of capacitor 750, to the first terminal of capacitor 743, to the first terminal of resistor 749, and to the first terminal of NMOS FET 748. The second terminal of resistor 733 is coupled through node 778 to the gate terminal PMOS FET 735, and to the first terminal of NMOS FET 734. The second terminal of PMOS FET 735 is coupled through node 781 to the first terminal of NMOS FET 736, to the first terminal of resistor 740, and to the cathode of zener diode 742.

Output DFM of analog front end interface circuit 701 is coupled through node 779 to the gate of NMOS FET 734. The second terminal of resistor 740 is coupled through node 782 to input DCI of analog front end line interface circuit 701. Input DCI is coupled though node 7122 to an input of low pas filter and voltage/current (V/I) adjustment block 706. An output of low pass filter and V/I adjustment block 706 is coupled through node 7123 to an input of transconductance control block 707. The second terminal of resistor 740 is also coupled to the first terminal of resistor 741. An output of transconductance control block 707 is coupled through nodes 7124 to output OCG. Output OCG of AFELIC 701 is coupled through node 783 to the gate of NMOS FET 736 and to the first terminal of capacitor 739. The second terminal of NMOS FET 736 is coupled through node 784 to the anode of diode 738, to the first terminal of resistor 737, and to input DCS of AFELIC 701. Input DCS is coupled through node 7125 to transconductance control block 707.

Node 7109 is coupled to the first terminal of capacitor 723. The second terminal of capacitor 723 is coupled through node 7110 to clock generation circuit 705. The output of clock generation circuit 705 is coupled through node 7121 to an input of charge pump 704.

Node 7113 is coupled to the first terminal of capacitor 725. The second terminal of capacitor 725 is coupled through node 7114 to an input of one bit digital to analog (D/A) converter 711. The output of one bit D/A converter 711 is coupled through node 7140 to an input of transmit low pass filter 712. The drive point signal at inputs CC3 and CC4 are coupled through node 7138 to the first terminal of switch 7139. The second terminal of switch 7139 is coupled through node 7140 to transmit low pass filter 712. The output of transmit low pass filter 712 is coupled through nodes 7141 to the first terminal of switch 7142 and to the first terminal of switch 7144. The second terminal switch 7142 is coupled through node 7143 to a non inverting input of summer 713. The second terminal of switch 7144 is coupled through node 793 to the first terminal of capacitor 744.

The second terminal of capacitor 743 is coupled through node 789 to the first terminal of resistor 746 and to the first terminal of resistor 745. The second terminal of capacitor 744 is coupled through node 790 to the second terminal resistor 746 and to the first terminal of resistor 747. The second terminal of resistor 745 is coupled through node 791 to input ACP of AFELIC 701. Input ACP is coupled through node 7126 to an input of anti alias and high pass filter 708. The second terminal of resistor 747 is coupled through node 792 to input ACN of AFELIC 701. Input ACN is coupled through node 7127 to an input of anti alias and high pass filter 708.

The output of anti alias and high pass filter 708 is coupled through node 7128 to an input of low pass and notch filter 709, to the first terminal of switch 7129, and to the first terminal of switch 7130. The second terminal of switch 7130 is coupled through node 7131 to a non inverting input of summer 713.

The output of receive low pass and notch filter 709 is coupled through node 7132 to the first terminal of switch 7133, and through node 7135 to the first terminal of switch 7136. The second terminal of switch 7129 is also coupled to the first terminal of switch 7133 and the first terminal of switch 7136. The second terminal of switch 7133 is coupled through node 7134 to an observation signal at input CC0 and CC1. The second terminal of switch 7136 is coupled through node 7137 to an input of sigma delta modulator 710. The output of sigma delta modulator 710 is coupled through node 7112 to the first terminal of capacitor 724. The second terminal of capacitor 724 is coupled to node 7111.

The output of summer 713 is coupled through node 7145 to the input of AC impedance filter 714. The output of AC impedance filter is coupled through node 7146 to a first input of transconductance driver 715. A second input of transconductance driver 715 is coupled through node 788 to the first terminal of resistor 756. The output of transconductance driver 715 is coupled to an input of series/shunt supply regulator 716. The second terminal of NMOS FET 748 is coupled through node 795 to an input of series/shunt supply regulator 716. An output of series/shunt supply regulator 716 is coupled through node 794 to the gate terminal of NMOS FET 748.

The second terminal of capacitor 750 is coupled through node 785 to the cathode of zener diode 751. The anode of zener diode 751 is coupled through node 786 to the first terminal of resistor 752.

Series/shunt supply regulator 716 is coupled to voltages VPA and VPD, which are analog and digital supply voltages, respectively. Voltages VPA and VPD are also coupled through node 787 to the second terminal of resistor 749, to the second terminal of resistor 752, to the first terminal of capacitor 755, to the first terminal of capacitor 754, and to the cathode of zener diode 753.

The second terminal of NMOS FET 734 is coupled through node 780 to the anode of diode 731, to the anode of diode 732, to the anode zener diode 742, to the second terminal of resistor 741, to the cathode of diode 738, to the second terminal of resistor 737, to the second terminal of capacitor 739, to the anode of zener diode 753, to the second terminal of capacitor 754, to the second terminal of capacitor 755, to the second terminal of resistor 756, and to voltages VNA and VND, which are analog and digital grounds, respectively.

The telephone line which comprises conductors 770 and 771 is fullwave rectified by diodes 729, 730, 731, and 732 to provide a negative voltage at the anodes of diodes 731 and 732 and a positive voltage at the cathodes of diodes 729 and 730. The negative voltage at the anodes of diodes 731 and 732 is coupled to voltage VND and voltage VNA. Thus, the negative voltage at the anodes of diodes 731 and 732 is used as both an analog and digital ground. The positive voltage at the cathodes of diodes 729 and 730 is regulated by series/shunt supply regulator 716 to provide voltages VPA and VPD, the positive analog and digital supply voltages respectively.

A sigma-delta modulated transmit signal at node 7113 is coupled through capacitor 725 to one bit D/A converter 711. One bit D/A converter 711 converts the sigma-delta bit stream to an analog signal. Transmit low pass filter 712 filters the analog signal to reduce quantization noise. The filtered analog transmit signal is provided to summer 713 and is also applied to a single-ended to differential conversion circuit comprising capacitors 743 and 744 and resistors 745, 746, and 747. The differential input signal from the single-ended to differential conversion network is applied to anti-alias and high-pass filter 708, which removes components of the signal that would otherwise be aliased during sigma-delta modulation. The filtered signal is passed through receive low-pass and notch filter 709 to sigma-delta modulator 710. Receive low-pass and notch filter 709 may be bypassed by switch 7129. Sigma-delta modulator 710 produces a sigma-delta bit stream of the receive signal that is coupled through capacitor 724 to node 7111.

Since the transmit signal at node 793 is a single ended signal referenced to voltage VNA, which is derived from the negative side of the telephone line, and the signal at node 777 is derived from the positive side of the telephone line, the signal applied to capacitor 743 has a voltage equal to the voltage of the positive side of the telephone line, neglecting diode drops, and the signal applied to capacitor 744 has a voltage equal to the negative side of the telephone line offset in a positive direction by the magnitude of the transmit signal, again neglecting diode voltage drops. If the transmit signal is zero, the signal applied capacitor 744 has a voltage equal to the voltage of the negative side of the telephone line. Thus, the voltage across the telephone line is applied across capacitors 743 and 744. Since any received signal is present across the telephone line, the received signal will be applied to capacitors 743 and 744. The received signal is then filtered, sigma-delta modulated, and coupled across capacitor 724 to node 7111.

If a transmit signal is applied to node 7113, it is coupled through capacitor 725 to one bit D/A converter 711. One bit D/A converter 711 converts the sigma-delta bit stream input to an analog transmit signal, which is low-pass filtered by transmit low-pass filter 712. The low-pass filtered analog transmit signal is summed with the signal at node 7131 and passed through AC impedance filter 714 to transconductance driver 715. Transconductance driver 715 causes the transmit signal to be applied to the phone line.

Since transconductance driver 715 applies the transmit signal to the telephone line, both the transmit signal and the receive signal are present simultaneously on the telephone line. To properly receive the receive signal, it is necessary to separate the receive signal from the transmit signal. The function of separating the transmit signal from the receive signal is commonly referred to as the hybrid function.

To provide the hybrid function, the transmit signal is applied to node 793. Since the transmit signal is applied to the telephone line, and the telephone line is coupled through diodes 729 and 730 to node 777, the transmit signal is applied to both capacitor 743 and 744. Since the transmit signal is in phase at these two capacitors, the transmit signal is applied as a common mode signal, which is canceled out by the single ended to differential conversion network. Thus, the transmit signal is not applied to anti-alias and high pass filter 708. However, since the receive signal is present as a differential signal across the telephone line, and is applied in its differential form across nodes 777 and 793, the receive signal is produced as a differential output by the single-ended to differential conversion network. Thus, the receive signal is applied to anti-alias and high pass filter 708. Since only the receive signal, not the transmit signal, is applied to anti alias and high-pass filter 708, the hybrid function has been provided.

AC and DC line impedance matching is provided by an AC transconductance loop and DC transconductance loop. The AC transconductance loop comprises the single ended to differential conversion network, anti-alias and high-pass filter 708, summer 713, AC impedance filter 714 and transconductance driver 715. The AC transconductance loop may be adjusted to match the off-hook telephone line AC impedance standards. A DC transconductance loop comprises low pass filter and voltage/current (V/I) adjustment block 706, and transconductance control 707, along with external components such as NMOS FET 736. The DC transconductance loop may be adjusted to allow with compliance with off-hook telephone line DC impedance standards.

Solid state relays 763, 764, and 765 and resistors 766 and 767 allow current sensing and switching of the telephone line. Current sensing may be used to implement a parallel pick-up feature. The parallel pick-up feature may be used to disable a modem circuit when a telephone extension is picked up. Such a feature is useful if it is desired to place an emergency voice telephone call while modem communication is in progress on the telephone line. Loop current indicator and step detector 721 may be used to sense a change in voltage caused by a change in current through resistors 766 and 767. The changes detected by loop current indicator and step detector 721 are passed to LED driver 722, which communicates the information to optocoupler 727. Other status signals may be applied at inputs CC0 through CC4. These inputs are passed to LED driver 722, which communicates the information over optocoupler 727.

Command information may be communicated to the AFELIC 701 through optocoupler 726. Signals transmitted through optocoupler 726. Signals transmitted through optocoupler 726 are received by serial interface 717, which provides the signals to digital control block 718. Digital control block 718 uses the signals to control the operation of AFELIC 701 and associated circuitry.

Clock signals applied to node 7109 are passed through capacitor 723 and received by clock generation block 705. Clock generation block 705 provides clock signals to charge pump 704. Clock generation block 705 also provides timing information other portions of AFELIC 701. For example, clock generation block 705 provides timing information to circuits for communicating through capacitors 724 and 725.

In FIG. 7, the present invention may be used to reduce low frequency common mode interference present on signals crossing capacitors 723, 724, and/or 725. For example, the present invention may be used with clock generation block 705 to reduce low frequency common mode interference present on clock signal SCK at node 7110.

Thus, a method and apparatus for communicating a signal across a barrier while rejecting low frequency interference has been provided.

I claim:

1. Apparatus comprising:

a driver for providing a signal;

a capacitor having a first terminal and a second terminal, said first terminal coupled to said driver, said capacitor for coupling said signal from said first terminal to said second terminal;

an impedance element comprising a transconductance element coupled to said second terminal for filtering said signal, wherein said impedance element has a highpass filter characteristic and wherein said impedance element further comprises a feedback capacitor in a feedback loop around said transconductance element;

a comparator coupled to said impedance element for comparing said signal; and a reference voltage source coupled to said impedance element and to said comparator, wherein said transconductance element comprises:

an amplifier having a first amplifier input, a second amplifier input, and an amplifier output;

a field effect transistor (FET) having a gate terminal, a first FET terminal, and a second FET terminal, said amplifier output coupled to said gate terminal, said first amplifier input coupled to said first FET terminal, said second FET terminal coupled to a first feedback capacitor terminal of said feedback capacitor, and said second amplifier input coupled to a second feedback capacitor terminal of said feedback capacitor.

2. The apparatus of claim 1 wherein said reference voltage source is coupled to said first amplifier input.

3. The apparatus of claim 2 wherein said capacitor couples said signal across an isolation barrier.

4. The apparatus of claim 3 wherein said isolation barrier isolates a modem circuit from a telephone line.

5. The apparatus of claim 4 wherein said impedance element rejects low frequency common mode signals.

6. The apparatus of claim 5 wherein said signal is a clock signal.

* * * * *